US012739498B2

(12) United States Patent
Gemini et al.

(10) Patent No.: US 12,739,498 B2
(45) Date of Patent: Sep. 15, 2026

(54) POWER CONTROL FOR AN IMAGE SENSOR

(71) Applicant: QUALCOMM Incorporated, San Diego, CA (US)

(72) Inventors: Sumit Gemini, Delhi (IN); Nikhil Kumar Kansal, San Diego, CA (US); Bhargav Bipinchandra Pandya, Hyderabad (IN); Jin Wu, Shanghai (CN); Ravi Shankar Kadambala, Hyderabad (IN); Ravi Kishore Tanuku, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 18/843,113

(22) PCT Filed: May 5, 2022

(86) PCT No.: PCT/CN2022/090886
§ 371 (c)(1),
(2) Date: Aug. 30, 2024

(87) PCT Pub. No.: WO2023/212847
PCT Pub. Date: Nov. 9, 2023

(65) Prior Publication Data

US 2025/0175697 A1 May 29, 2025

(51) Int. Cl.
*H04N 23/65* (2023.01)
*H04N 23/60* (2023.01)

(52) U.S. Cl.
CPC ......... *H04N 23/651* (2023.01); *H04N 23/665* (2023.01)

(58) Field of Classification Search
CPC .. H04N 23/651; H04N 23/665; G06F 9/5022; G06F 9/5016; G06F 1/3215; G06F 1/324
See application file for complete search history.

(56) References Cited

U.S. PATENT DOCUMENTS 10,452,840 B2 * 10/2019 Chen .................. H04L 63/1441
11,847,009 B1 * 12/2023 Khosrowpour ..... G06F 11/3433
2014/0092264 A1 4/2014 Kim et al.
2014/0136867 A1 * 5/2014 Yamamoto ............. G01P 15/14
713/320

(Continued)

FOREIGN PATENT DOCUMENTS

CN 102402380 A 4/2012
CN 109144728 A 1/2019
WO 2019109290 6/2019

OTHER PUBLICATIONS

International Search Report and Written Opinion—PCT/CN2022/090886—ISA/EPO—Dec. 21, 2022.

*Primary Examiner* — Padma Haliyur
(74) *Attorney, Agent, or Firm* — Patterson & Sheridan LLP/QUALCOMM Incorporated

(57) ABSTRACT

The present disclosure relates to methods and apparatus for power control of a computing device including an image sensor. An example method includes receiving, from an application running on the computing device, a camera close call; receiving, from the application, an indication of the context of the camera close call; and based on the context of the camera close call, setting an operation mode of at least one of the processor or the bus.

13 Claims, 5 Drawing Sheets

(56) References Cited

U.S. PATENT DOCUMENTS

2016/0370838 A1* 12/2016 Gu .......................... G06F 1/324
2016/0381658 A1* 12/2016 Ghosh ................. H04W 68/005
455/458
2017/0006224 A1* 1/2017 Kim ....................... H04N 25/70
2017/0006225 A1* 1/2017 Fu .......................... H04N 23/51
2017/0315606 A1* 11/2017 Tanaka .................. G06F 9/5094
2018/0018456 A1* 1/2018 Chen ..................... G06F 21/552
2018/0075575 A1 3/2018 Bostick et al.
2019/0087198 A1* 3/2019 Frascati ................... H04N 9/79
2019/0191079 A1* 6/2019 Mehta .................. H04N 23/617
2019/0356792 A1* 11/2019 Kuwabara .......... H04N 1/00172
2020/0079307 A1* 3/2020 Asai ........................ B60R 99/00
2021/0021765 A1* 1/2021 Watanabe ............ H04N 23/651
2021/0109585 A1* 4/2021 Fleming ................ G06F 1/3231
2021/0117818 A1* 4/2021 Teng ....................... G06F 1/163
2021/0195114 A1* 6/2021 Sakaki ................. H04N 23/651
2022/0121288 A1* 4/2022 Wu ....................... G06F 1/1698
2023/0065399 A1* 3/2023 Ren ....................... B60W 40/09
2024/0031672 A1* 1/2024 Rao ...................... H04N 23/631

* cited by examiner

POWER CONTROL FOR AN IMAGE SENSOR

CROSS-REFERENCE TO RELATED APPLICATIONS

This application is a national stage application under 35 U.S.C. 371 of PCT/CN2022/090886, filed May 5, 2022, which is hereby expressly incorporated by reference herein in its entirety as if fully set forth below and for all applicable purposes.

BACKGROUND

Field of the Disclosure

The present disclosure relates generally to processing systems and, more particularly, to one or more techniques for power control of a computing device including an image sensor.

Description of Related Art

Many computing devices include one or more images sensors (e.g., charge-coupled device (CCD) sensors, complementary metal oxide semiconductor (CMOS) sensors, or other camera sensors) for capturing still images and/or videos. Examples of such computing devices include dedicated digital cameras, tablets, laptops, smartphones, other mobile devices, wearables, Internet of Things devices, automotive devices, etc.

Mobile computing devices that use an image sensor may include a battery for power. As batteries are able to provide a limited amount of power before needing to be recharged, reducing power consumption of a mobile computing device can beneficially increase the time a user can use the mobile computing device prior to needing to recharge the device. Operation of an image sensor, including operation of other components and resources of a mobile computing device that support use of the image sensor, consumes battery power of the mobile computing device. Accordingly, techniques for reducing the power consumption for operating an image sensor can beneficially increase the time a user can use the mobile computing device prior to needing to recharge the device, thereby making for a better user experience.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In certain aspects, a method for power control of a computing device comprising a processor and a bus is disclosed. The method includes receiving, from an application running on the computing device, a camera close call; receiving, from the application, an indication of the context of the camera close call; and based on the context of the camera close call, setting an operation mode of at least one of the processor or the bus.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a computing device, a processing system, etc.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
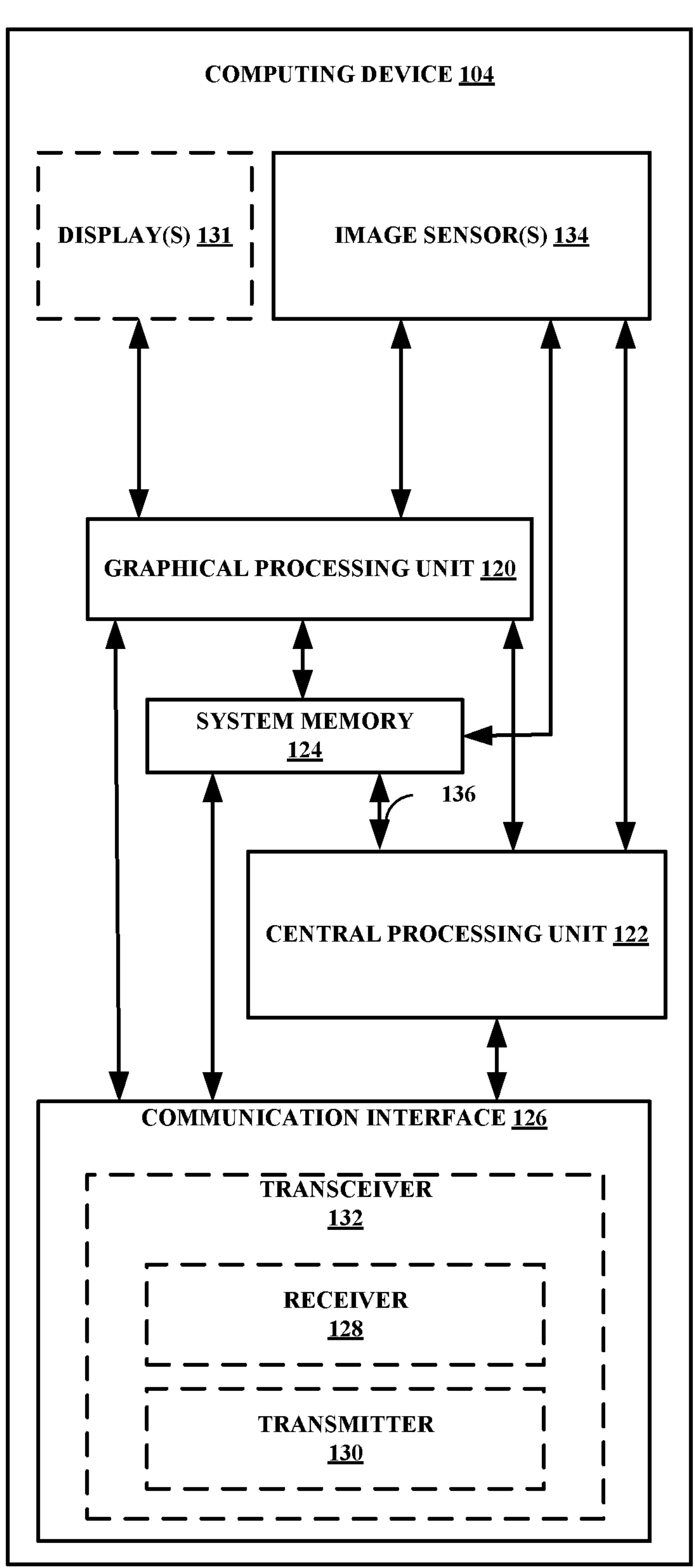
FIG. 1 is a block diagram that illustrates an example computing device including an image sensor, in accordance with certain aspects of the present disclosure.

The present disclosure provides techniques for power control of a computing device based on the context of a camera close call occurring at the computing device.

In certain aspects, an application (e.g., a camera app, video call app, camera scanner app, etc.) running on the computing device may utilize an image sensor of the computing device to capture one or more images. In order to operate the image sensor, a kernel (e.g., of an operating system, such as an Android operating system) running on the computing device may start a camera session, including allocating resources to the image sensor or application, such as memory resources for buffering or storing images captured by the image sensor, bus resources for moving data between components such as processors and memory, and/or processor resources for running processes that support operation of the image sensor. In certain aspects, starting the camera session further includes starting one or more processes that support operation of the image sensor. For example, a camera driver of the kernel may start the camera session.

When the application is no longer using the image sensor, the application may issue a camera close call. In certain aspects, the camera close call may be an application programming interface (API) call to an API framework running on the computing device.

An application may issue a camera close call in a number of different contexts. For example, the application may issue a camera close call due to a command to close the application, due to input on a power/sleep/resume button of the computing device, due to input on a return to home-screen button of the computing device, etc. Such example contexts may be examples of contexts indicating to actually close the image sensor (e.g., put the camera in a closed state) as it is not expected to be used further by the application.

In contrast, other example contexts where an application issues a camera close call are for a mode switch of the image sensor, such as moving from using a first image sensor to a second image sensor (e.g., between front and rear image sensors) of the computing device for capturing images. Another example mode switch of the image sensor includes changing between capturing images using standard dynamic range (SDR) and capturing images using high dynamic range (HDR). Another example mode switch of the image sensor includes changing between capturing still images and capturing video, such as the triggering of a video call, causing a camera open, and a camera app for capture images being moved to the background, causing a camera close. Such example contexts may be examples of contexts indicating that an image sensor of the computing device is expected to be used further by the application.

In certain aspects, in response to the camera close call, the camera driver tears down the camera session, such as deallocating resources that had been allocated to the image sensor or application, regardless of the context in which the camera close call is issued. In the case where the camera close call is in the context of a mode switch, a new camera session may then have to be started for the application to use the image sensor. The tearing down of a camera session and the starting of a new camera session can be time consuming, and negatively impact user experience.

Accordingly, in some cases, to reduce the latency involved with a tear down of a camera session and the potential start of a new camera session, one or more components of the computing device may be tuned to run in a high performance mode for at least a period of time after receiving the camera close call, regardless of the context in which the camera close call is issued. For example, one or more processors of the computing device and/or one or more buses of the computing device may be operated at a high frequency and/or high voltage. In particular, by operating the one or more components in a high performance mode, should the camera close call be associated with a mode switch of the image sensor, then the new camera session will be started with lower latency, thereby improving user experience. However, the one or more components may also be operated in the high performance mode for a period of time, even when the camera close call is associated with an actual close of the image sensor, which may utilize more power of the computing device, thereby reducing battery life. In particular, high performance mode may not be necessary for user experience when actually closing the image sensor, as the user is not aware of the extra time needed for closing the image sensor, but may be impacted by increased power consumption.

Accordingly, certain aspects herein provide techniques to control the operation of one or more components (e.g., one or more processors, one or more buses, and/or the like) in response to a camera close call issued by an application based on a context of the camera close call. In particular, in certain aspects, techniques are provided to determine the context of an issued camera close call at a computing device. In certain aspects, if the context indicates the camera close call is based on actually stopping/closing use of the image sensor, the one or more components are operated in a lower performance mode. In certain aspects, if the context indicates the camera close call is based on a mode switch of the image sensor, the one or more components are operated in a higher performance mode relative to the lower performance mode. By controlling the operation of components based on the context of the camera close call, latency of a mode switch operation can be reduced, while at the same time, power consumption for stopping/closing use of the image sensor can also be reduced, thereby improving performance of the computing device.

Various aspects of systems, apparatuses, computer program products, and methods are described more fully hereinafter for power control of a computing device based on the context of a camera close call occurring at the computing device. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different graphics technologies, system configurations, etc., some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs, central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a block diagram that illustrates an example computing device 104 configured to implement one or more techniques of this disclosure. The computing device 104 may include one or more components or circuits for performing various functions described herein. In some examples, one or more components of the computing device 104 may be components of a system on a chip (SOC) or integrated circuit (IC). The computing device 104 may include one or more components configured to perform one or more techniques of this disclosure. In the example shown, the device 104 may include a GPU 120, a CPU 122, a system memory 124, and one or more image sensors 134 (e.g., CCD sensors, CMOS sensors, etc.). In some aspects, the device 104 can include a number of optional components, e.g., a communication interface 126, a transceiver 132 (e.g., including a receiver 128 and a transmitter 130), and one or more displays 131. In certain aspects, the components are communicatively connected to one another by one or more buses 136. It should be noted that though certain connections are shown between components in FIG. 1, the connections between components may be different than shown. For example, all components may be coupled to a shared bus 136, different components may be coupled to different buses, etc.

Reference to the display 131 may refer to the one or more displays 131. For example, the display 131 may include a single display or multiple displays. The GPU 120 may be configured to perform graphics processing. The one or more displays 131 may be configured to display or otherwise present frames processed by the GPU 120 and/or CPU 122. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the GPU 120 and the CPU 122, such as system memory 124, may be accessible to the GPU 120 and the CPU 122. For example, the GPU 120 and the CPU 122 may be configured to read from and/or write to external memory, such as the system memory 124. The GPU 120 and the CPU 122 may be communicatively coupled to the system memory 124 over a bus. In some examples, the GPU 120 and the CPU 122 may be communicatively coupled to each other over the bus or a different connection.

The CPU 122 and/or GPU 120 may be configured to receive image content (e.g., still images, video, etc.) from one or more image sensors 134. For example, CPU 122 and/or GPU 120 may be configured to receive image content directly from one or more image sensors 134. In certain aspects, the one or more image sensors 134 may be configured to write image content to external memory, such as the system memory 124. In certain aspects, CPU 122 and/or GPU 120 may be configured to receive (e.g., read) the image content from system memory 124.

The system memory 124 may include one or more volatile or non-volatile memories or storage devices. In some examples, system memory 124 may include RAM, SRAM, DRAM, erasable programmable ROM (EPROM), electrically erasable programmable ROM (EEPROM), flash memory, a magnetic data media or an optical storage media, or any other type of memory.

The system memory 124 may be a non-transitory storage medium according to some examples. The term "non-transitory" may indicate that the storage medium is not embodied in a carrier wave or a propagated signal. However, the term "non-transitory" should not be interpreted to mean that system memory 124 is non-movable or that its contents are static. As one example, the system memory 124 may be removed from the device 104 and moved to another device. As another example, the system memory 124 may not be removable from the device 104.

The GPU 120 may be a general purpose GPU, or any other processing unit that may be configured to perform graphics processing. In some examples, the GPU 120 may be integrated into a motherboard of the device 104. In some examples, the GPU 120 may be present on a graphics card that is installed in a port in a motherboard of the device 104, or may be otherwise incorporated within a peripheral device configured to interoperate with the device 104. The GPU 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the GPU 120 may store instructions for the software in a suitable, non-transitory computer-readable storage medium, e.g., system memory 124, and may execute the instructions in hardware using one or more processors to perform the techniques of this disclosure. Any of the foregoing, including hardware, software, a combination of hardware and software, etc., may be considered to be one or more processors.

The CPU 122 may be any processing unit configured to send instructions to the GPU 120 and perform general computational processing (e.g., non-graphical processing). In some examples, the CPU 122 may be integrated into a motherboard of the device 104. The CPU 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the CPU 122 may store instructions for the software in a suitable, non-transitory computer-readable storage medium, e.g., system memory 124, and may execute the instructions in hardware using one or more processors to perform the techniques of this disclosure. Any of the foregoing, including hardware, software, a combination of hardware and software, etc., may be considered to be one or more processors.

In some aspects, the computing device 104 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information from another device. The transmitter 130 may be configured to perform any transmitting function described herein with respect to the device 104. For example, the transmitter 130 may be configured to transmit information to another device. The receiver 128 and the transmitter 130 may be combined into a transceiver 132. In such examples, the transceiver 132 may be configured to perform any receiving function and/or transmitting function described herein with respect to the device 104.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular hardware component (e.g., a GPU), but, in further embodiments, can be performed using other hardware components (e.g., a CPU), consistent with disclosed embodiments.

Figure 2:
FIG. 2 is a block diagram illustrating an example software stack of the computing device of FIG. 1, in accordance with certain aspects of the present disclosure.
Figure 2:
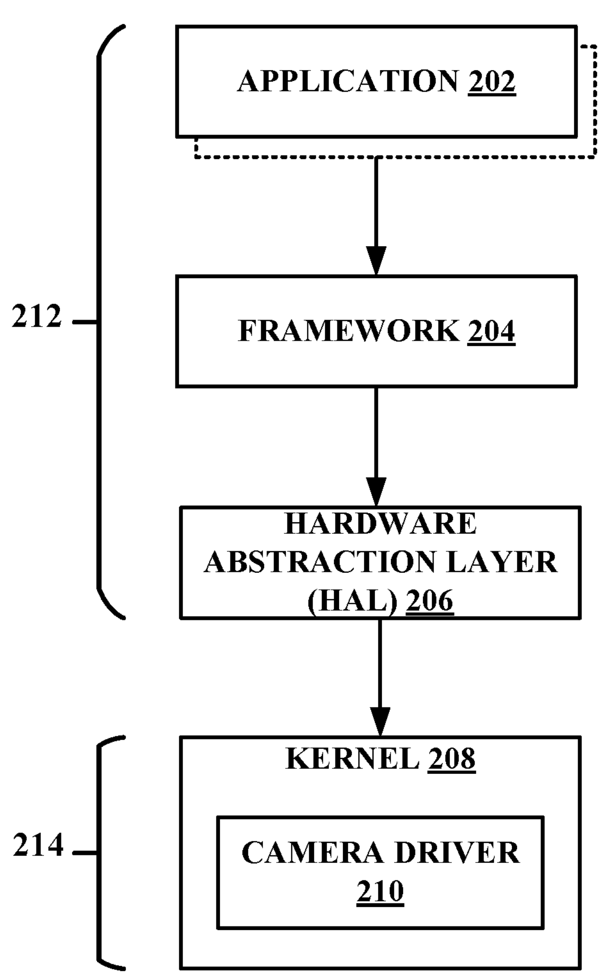

FIG. 2 is a block diagram illustrating an example software stack 200 executing on the computing device 104 of FIG. 1. It should be noted that the software stack 200 could also execute on other suitable computing devices. Further, in certain aspects, computing device 104 may execute other similar software, including fewer or additional components, to perform the techniques discussed herein. For example, the functionality of one or more component discussed may be combined in a single component, or may be divided into additional components. In certain aspects, code for software stack 200 may be stored in memory, such as system memory 124 of computing device 104. Further, in certain aspects, software stack 200 may be executed by one or more processors, such as CPU 122 of computing device 104.

As shown, software stack 200 includes one or more applications 202, a framework 204 (e.g., Android framework), a hardware abstraction layer (HAL) 206, and a kernel 208 (e.g., Linux kernel for Android) including a camera driver 210. In certain aspects, one or more applications 202, framework 204, and/or HAL 206 run in user space 212, meaning they have access to memory and/or resources defined as accessible within user space 212, which may be less than a number of memory and/or resources defined as accessible within kernel space 214. In certain aspects, the kernel 208 runs in kernel space 214.

In certain aspects, the one or more applications 202 may utilize the one or more image sensors 134 of computing device 104 to capture one or more images (e.g., still images, video, etc.). For example, one or more applications 202 may include one or more of a camera app, a video call app, a camera scanner app, or the like.

In certain aspects, framework 204 is an API framework that provides APIs (e.g., a set of Java framework APIs) that expose the functionality of native libraries, system components, and/or services to applications, such as application 202. For example, framework 204 provides APIs to expose the functionality of one or more image sensors 134 to application 202, such as the camera close function.

In certain aspects, HAL 206 provides standard interfaces that expose device hardware capabilities to the framework 204. For example, in certain aspects, HAL 206 includes library modules, which implement an interface for hardware components, such as one or more image sensors 134. In certain aspects, when framework 204 makes a call to access a hardware component, the HAL 206 loads the library module for the hardware component. For example, when the framework 204 issues a camera close event to access one or more image sensors 134, HAL 206 communicates with the camera driver 210 in kernel 208 as discussed further herein.

In certain aspects, kernel 208 interfaces with hardware components, such as adjusting an operation mode (e.g., operating frequency and/or voltage) of one or more components (e.g., CPU 122, GPU 120, and/or bus 136). In certain aspects, kernel 208 includes one or more drivers, each driver for interfacing with a particular hardware component. For example, kernel 208 includes camera driver 210 for interfacing with one or more image sensors 134.

As discussed, application 202 may issue a camera open call to an API of framework 204 to utilize an image sensor 134 to capture one or more images. Accordingly, framework 204 may issue a camera open event to HAL 206. HAL 206 may load library modules for image sensor 134, and issue instructions to kernel 208 and camera driver 210 to start a camera session, including allocating resources to the image sensor 134 and/or application 202, such as: memory resources of system memory 124 for buffering or storing images captured by the image sensor 134; bus resources of bus 136 for moving data between components such as CPU 122, GPU 120, and/or system memory 124; and/or processor resources of CPU 122 and/or GPU 120 for running processes/library modules that support operation of the image sensor 134.

In certain aspects, application 202 may issue a camera close call, such as to an API of framework 204, which may be handled based on a context of the camera close call according to the techniques discussed herein.

Figure 3A:
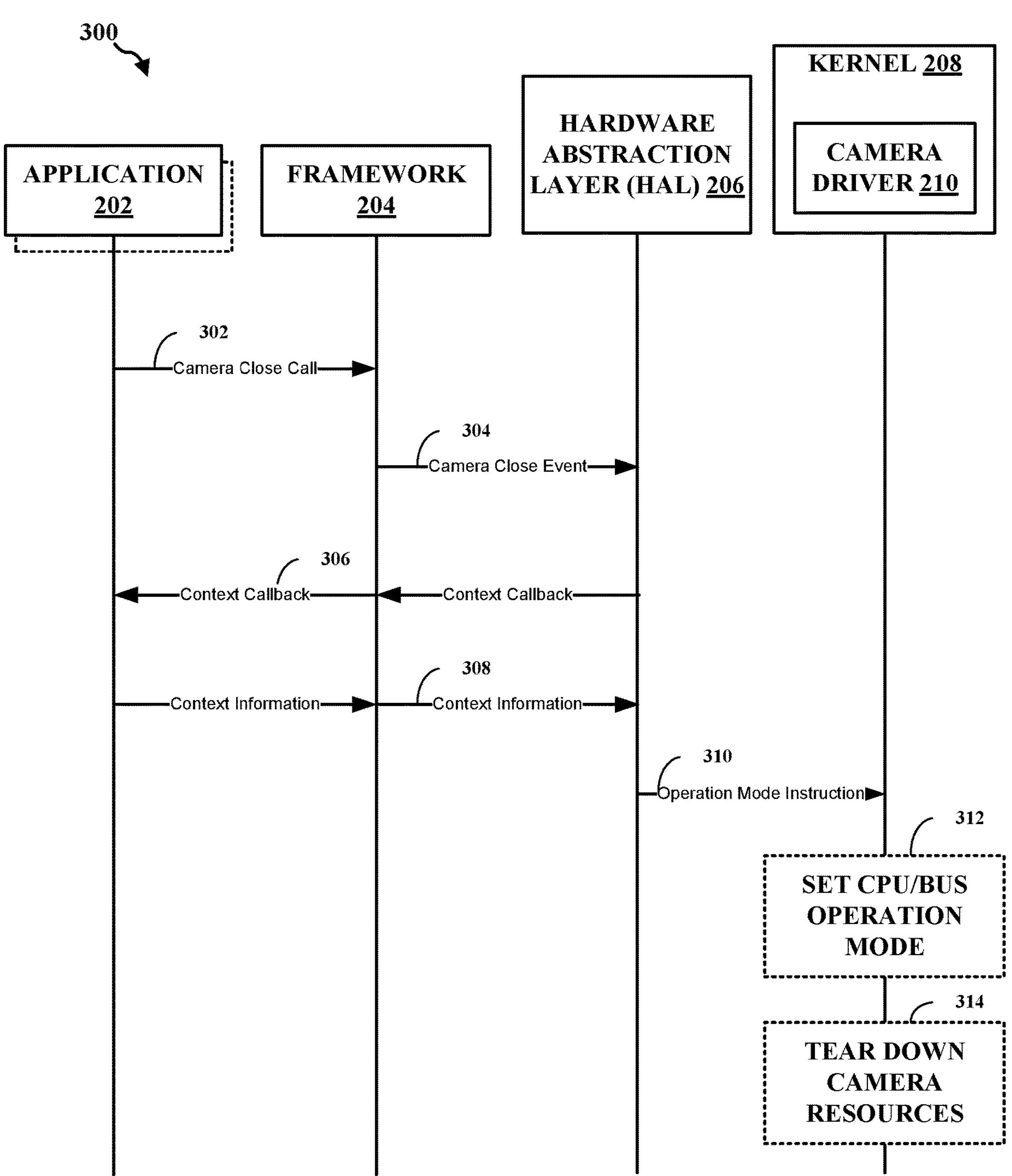
FIGS. 3A and 3B are each a block diagram illustrating an example call flow for power control of a computing device, in accordance with certain aspects of the present disclosure.

FIG. 3A is a block diagram illustrating an example call flow 300 for power control of a computing device, in accordance with certain aspects of the present disclosure. Call flow 300 is described with respect to software stack 200. However, it should be understood that call flow 300, or techniques similar thereto, may be performed by any suitable software running on any suitable computing device.

At 302, application 202 issues a camera close call to an API of framework 204. In certain aspects, the camera close call is a standard camera close call, and all camera close calls cause a callback to be issued for context as discussed herein. In certain aspects, the camera close call is a specialized camera close call (e.g., camera_context_close call) for which a callback is then issued for context as discussed herein, while a standard camera close call does not cause a callback to be issued for context. As discussed, application 202 may issue the camera close call in a number of different contexts. For example, application 202 may issue the camera close call to actually close the image sensor 134, such as for one of the following contexts: due to a command to close the application 202, due to input on a power button of the computing device 104, due to input on a return to home-screen button of the computing device 104, etc. In another example, application 202 may issue the camera close call for a mode switch, such as for one of the following contexts: moving from using a first image sensor 134 to another image sensor 134 for capturing images, changing between an SDR and an HDR mode, changing between still image and video mode, etc.

At 304, based on receiving the camera close call, framework 204 issues a camera close event to HAL 206. HAL 206, previously, may have registered a callback function with framework 204. In particular, based on the registered callback function, HAL 206 is able to issue a callback to application 202, via framework 204, to determine a context of the camera close call.

Accordingly, at 306, based on receiving the camera close event, HAL 206 issues a context callback to application 202, via framework 204. In response to the context callback, at 308, application 202 sends, via framework 204, context information to HAL 206. In certain aspects, the context information indicates whether the camera close call is associated with an actual stopping/closing of the use of one or more image sensors 134 or whether the camera close call is associated with continued use of one or more image sensors 134, such as a mode switch of one or more image sensors 134, as discussed. Accordingly, in certain aspects, the context information may simply be 1-bit, the value of which indicates the context. In certain aspects, the context information may provide more granularity, such as indicating a particular context, such as one of the examples discussed herein. For example, the context information may comprise a number of bits, and each value of the number of bits may map to a particular context.

At 310, based on the context of the camera close call, HAL 206 issues an operation mode instruction to kernel 208 (e.g., to camera driver 210). In certain aspects, the operation mode instruction comprises a tear down instruction to tear down a camera session associated with application 202 and/or one or more image sensors 134. In certain aspects, the operation mode instruction indicates the context of the tear down. In certain aspects, the operation mode instruction indicates an operation mode of one or more components of computing device 104 explicitly, such as with one or more values for operation (e.g., voltage, frequency, etc.) or one or more index values that map to one or more values for operation. In certain aspects, the operation mode instruction indicates an operation mode of one or more components of computing device 104 implicitly, such as by indicating the context, which may map to an operation mode of one or more components of computing device 104.

For example, where the context information indicates the camera close call is for an actual stopping/closing of the use of one or more image sensors 134, the operation mode instruction may indicate the operation mode(s) of one or more components as a first operation mode (e.g., a low power operation/performance mode). In certain aspects, where the context information indicates the camera close call is for continued use of one or more image sensors 134, the operation mode instruction may indicate the operation mode(s) of one or more components as a second operation mode (e.g., a high power operation/performance mode). In certain aspects, where the context information is more granular, more granular operation modes may be defined, such as different values for operation for different components for different contexts.

At 312, based on the operation mode instruction, kernel 208 may set or adjust an operation mode(s) of one or more components of computing device 104 to the operation mode(s) indicated in the operation mode instruction. In some aspects, setting the operation mode for a component may refer to not changing the operation mode, such as if the operation mode of the components is already set to the indicated operation mode.

At 314, in certain aspects, such as where the operation mode instruction is a tear down instruction, kernel 208 (e.g., camera driver 210) tears down the camera session, such as deallocating resources that had been allocated to one or more image sensors 134 or application 202. In certain aspects, the operation mode instruction is a tear down instruction, regardless of the context of the camera close call at 302. In certain aspects, if the context of the camera close call at 302 is an actual stopping/closing of the use of one or more image sensors 134, the operation mode instruction is a tear down instruction. In certain aspects, if the context of the camera close call at 302 is associated with continued use of one or more image sensors 134, the operation mode instruction may not be a tear down instruction, and the camera session may be maintained.

In certain aspects, where the camera session is torn down, and the context of the camera close call at 302 is associated with continued use of one or more image sensors 134, a new camera session is started, as discussed.

Figure 3B:
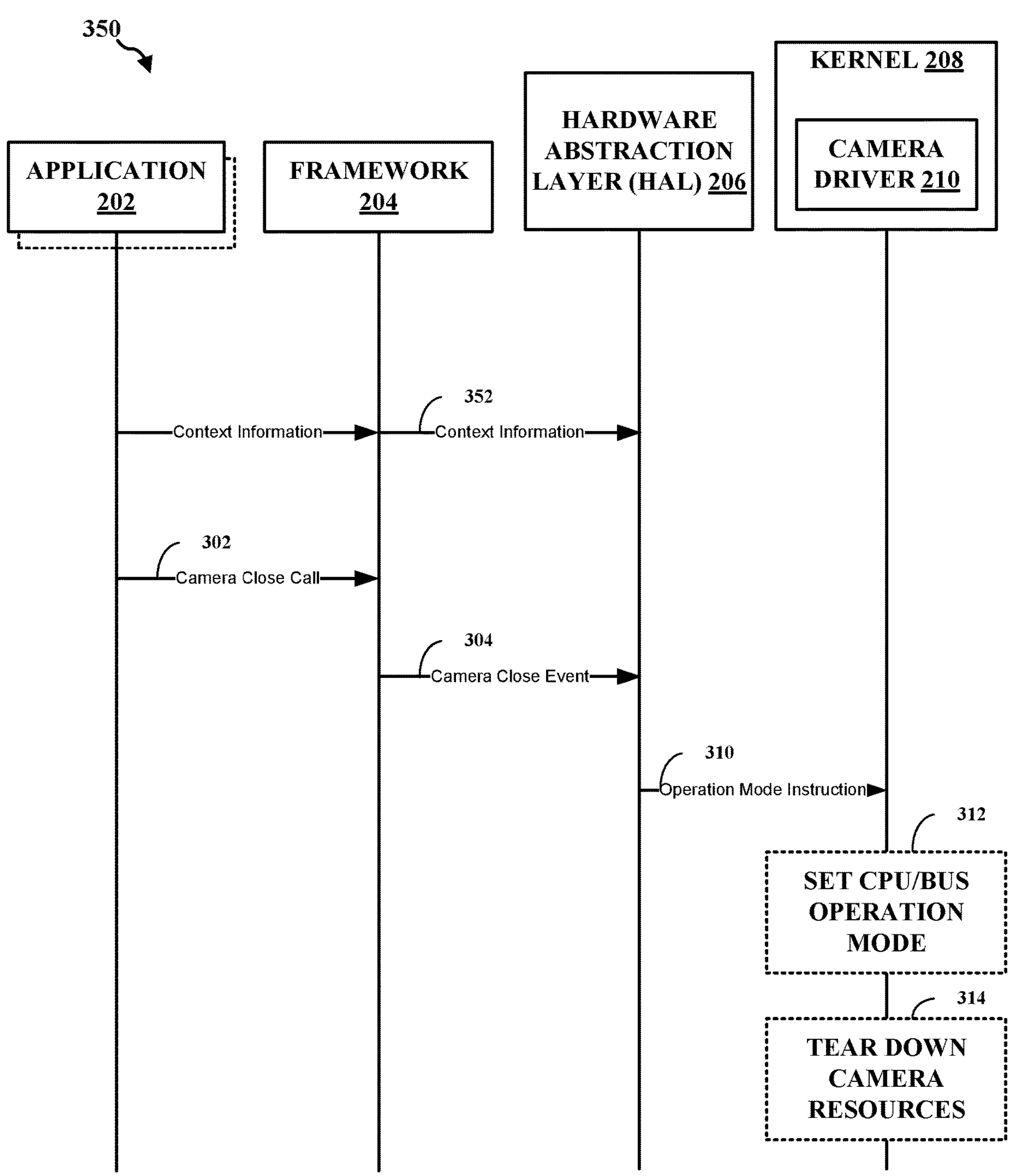

FIG. 3B is a block diagram illustrating an example call flow 350 for power control of a computing device, in accordance with certain aspects of the present disclosure. Call flow 350 is described with respect to software stack 200. However, it should be understood that call flow 350, or techniques similar thereto, may be performed by any suitable software running on any suitable computing device.

As shown, call flow 350 includes similar steps as call flow 300. However, instead of the context information being provided in response to the camera close call made by application 202, the context information is provided independent of the camera close call. For example, prior to issuing the camera close call, application 202 sends context information to HAL 206 at 352 (similar to 308 of FIG. 3A).

In certain aspects, application 202 independently sends the context information, without further callback by framework 204 or HAL 206. In certain aspects, application 202 may make an API call, such as a context call, that causes framework 204 and/or HAL 206 to issue a callback for context information (similar to 306 of FIG. 3A), and 352 occurs thereafter.

Figure 4:
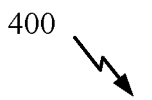
FIG. 4 is a flow diagram illustrating example operations for power control of a computing device, in accordance with certain aspects of the present disclosure.
Figure 4:
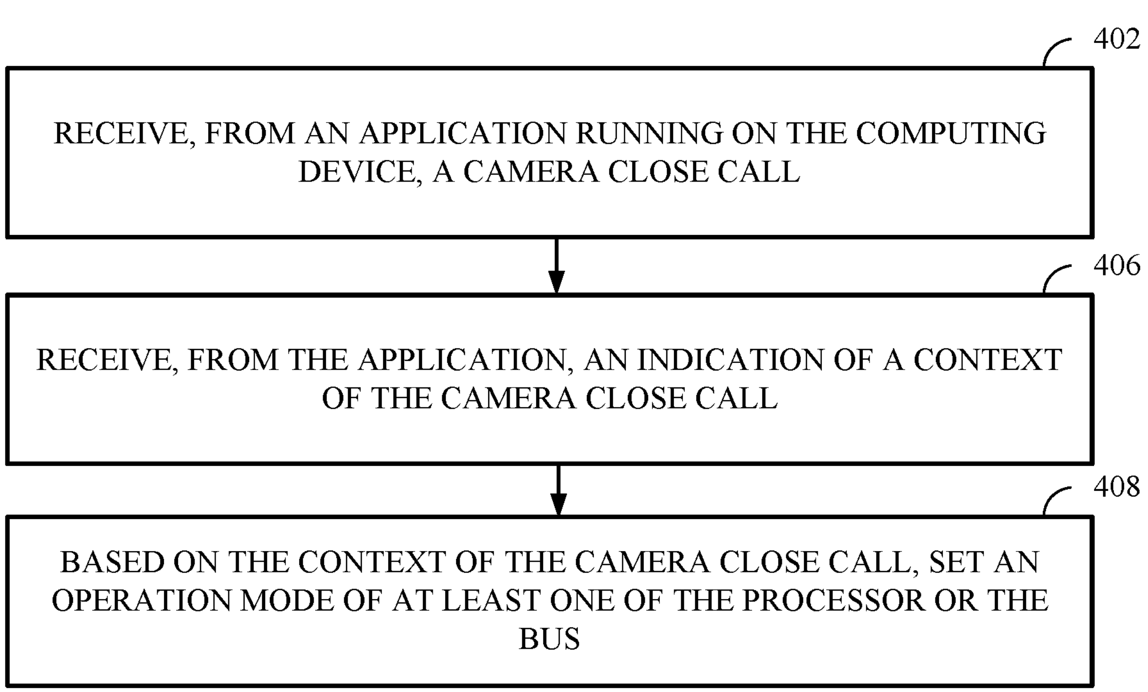

FIG. 4 is a flow diagram illustrating example operations 400 for power control of a computing device, in accordance with certain aspects of the present disclosure.

The operations 400 may be performed, for example, by a computing device (e.g., computing device 104 of FIG. 1). Operations 400 may be implemented as software components (e.g., software stack 200) that are executed and run on one or more processors (e.g., CPU 122 or GPU 120 of FIG. 1).

The operations 400 may begin, at a first block 402, by receiving, from an application running on the computing device, a camera close call.

The operations 400 may continue, at a third block 406, by receiving, from the application, an indication of a context of the camera close call.

The operations 400 may continue, at a fourth block 408, by based on the context of the camera close call, setting an operation mode of at least one of the processor or the bus.

In certain aspects of operations 400, the camera close call is an application programming interface (API) call to an API of a framework running on the computing device.

In certain aspects, operations 400 further include based on the camera close call, issuing a camera close event to a hardware abstraction layer, wherein the hardware abstraction layer communicates with a camera driver configured to control a camera sensor of the computing device.

In certain aspects, operations 400 further include, based on the camera close call, issuing a callback to the application to determine the context of the camera close call. In certain aspects, the callback is issued by the hardware abstraction layer in response to the camera close event In certain aspects of operations 400, the hardware abstraction layer registers a callback function to issue the callback when a camera close call is received In certain aspects of operations 400, based on the context of the camera close call, adjusting the operation mode of the at least one of the processor or the bus includes when the context indicates a close of the camera, setting the operation mode to a first operation mode; and when the context indicates a mode switch of the camera, setting the operation mode to a second operation mode.

In certain aspects of operations 400, the second operation mode corresponds to operating the processor at a higher frequency than the first operation mode.

In certain aspects of operations 400, the mode switch comprises at least one of: a change between a standard dynamic range mode and a high dynamic range mode or a change between a first camera sensor and a second camera sensor.

In certain aspects of operations 400, the close of the camera comprises at least one of: input on a close button of the computing device or input on a home button of the computing device.

In certain aspects, operations 400 further include after setting the operation mode, deallocating resources for a camera sensor of the computing device.

Example Clauses

Implementation examples are described in the following numbered clauses:

Clause 1. A method of power control of a computing device comprising a processor and a bus, comprising:
- receiving, from an application running on the computing device, a camera close call;
- receiving, from the application, an indication of the context of the camera close call; and
- based on the context of the camera close call, setting an operation mode of at least one of the processor or the bus.

Clause 2. The method of Clause 1, wherein the camera close call is an application programming interface (API) call to an API of a framework running on the computing device.

Clause 3. The method of Clause 2, further comprising:
- based on the camera close call, issuing a camera close event to a hardware abstraction layer, wherein the hardware abstraction layer communicates with a camera driver configured to control a camera sensor of the computing device.

Clause 4. The method of Clause 3, further comprising, based on the camera close call, issuing a callback to the application to determine a context of the camera close call, wherein the callback is issued by the hardware abstraction layer in response to the camera close event.

Clause 5. The method of Clause 4, wherein the hardware abstraction layer registers a callback function to issue the callback when a camera close call is received.

Clause 6. The method of any one of Clauses 1-5, wherein based on the context of the camera close call, adjusting the operation mode of the at least one of the processor or the bus comprises:
- when the context indicates a close of the camera, setting the operation mode to a first operation mode; and
- when the context indicates a mode switch of the camera, setting the operation mode to a second operation mode.

Clause 7. The method of Clause 6, wherein the second operation mode corresponds to operating the processor at a higher frequency than the first operation mode.

Clause 8. The method of Clause 6, wherein the mode switch comprises at least one of: a change between a standard dynamic range mode and a high dynamic range mode, a change between capturing still images and capturing video, or a change between a first camera sensor and a second camera sensor.

Clause 9. The method of Clause 6, wherein the close of the camera comprises at least one of: input on a close button of the computing device or input on a home button of the computing device.

Clause 10. The method of any of Clauses 1-9, further comprising:
- after setting the operation mode, deallocating resources for a camera sensor of the computing device.

Clause 11: An apparatus, comprising: a memory comprising executable instructions; and a processor configured to execute the executable instructions and cause the apparatus to perform a method in accordance with any one of Clauses 1-10.

Clause 12: An apparatus, comprising means for performing a method in accordance with any one of Clauses 1-10.

Clause 13: A non-transitory computer-readable medium comprising executable instructions that, when executed by a processor of an apparatus, cause the apparatus to perform a method in accordance with any one of Clauses 1-10.

Clause 14: A computer program product embodied on a computer-readable storage medium comprising code for performing a method in accordance with any one of Clauses 1-10.

ADDITIONAL CONSIDERATIONS

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of power control of a computing device comprising a processor and a bus, the method comprising:
 receiving, from an application running on the computing device, a camera close call, wherein the camera close call is an application programming interface (API) call to an API of a framework running on the computing device;
 issuing a camera close event, based on the camera close call, to an interface between the framework and a camera driver, wherein the interface communicates with the camera driver configured to control a camera sensor of the computing device;
 receiving, from the application, context information indicating whether the camera close call is associated with a close of the camera or a mode switch of the camera;
 issuing a callback to the application, based on the camera close call, to determine the context of the camera close call, wherein the callback is issued by the interface in response to the camera close event; and
 based on the context information, setting an operation mode of at least one of the processor or the bus.

2. The method of claim 1, wherein based on the context information, setting the operation mode of the at least one of the processor or the bus comprises:
 in response to the context information indicating the camera close call is associated with the close of the camera, setting the operation mode of the at least one of the processor or the bus to a first operation mode; and
 in response to the context information indicating the camera close call is associated with the mode switch of the camera, setting the operation mode of the at least one of the processor or the bus to a second operation mode.

3. The method of claim 2, wherein the second operation mode corresponds to operating the processor at a higher frequency than the first operation mode.

4. The method of claim 2, wherein the context information indicating the camera close call is associated with the mode switch comprises context information indicating the camera close call is associated with at least one of: a change between a standard dynamic range mode and a high dynamic range mode, a change between capturing still images and capturing video, or a change between a first camera sensor and a second camera sensor.

5. The method of claim 2, wherein the context information indicating the camera close call is associated with the close of the camera comprises context information indicating the camera close call is associated with at least one of: input on a close button of the computing device or input on a home button of the computing device.

6. The method of claim 1, further comprising:
 after setting the operation mode, deallocating resources for a camera sensor of the computing device.

7. A computing device comprising:
 a bus;
 one or more memories comprising computer-executable code; and
 one or more processors configured to execute the computer-executable code to cause the computing device to:
  receive, from an application running on the computing device, a camera close call, wherein the camera close call is an application programming interface (API) call to an API of a framework running on the computing device;

issue a camera close event, based on the camera close call, to an interface between the framework and a camera driver, wherein the interface communicates with the camera driver configured to control a camera sensor of the computing device;

receive, from the application, context information indicating whether the API camera close call is associated with a close of the camera or a mode switch of the camera;

issue a callback to the application, based on the camera close call, to determine the context of the camera close call, wherein the callback is issued by the interface in response to the camera close event; and based on the context information, set an operation mode of at least one of the one or more processors or the bus.

8. The computing device of claim 7, wherein based on the context information, to set the operation mode of the at least one of the one or more processors or the bus, the one or more processors are configured to cause the computing device to:

in response to the context information indicating the camera close call is associated with the close of the camera, set the operation mode of the at least one of the one or more processors or the bus to a first operation mode; and in response to the context information indicating the camera close call is associated with the mode switch of the camera, set the operation mode of the at least one of the one or more processors or the bus to a second operation mode.

9. The computing device of claim 8, wherein the second operation mode corresponds to operating the processor at a higher frequency than the first operation mode.

10. The computing device of claim 8, wherein the context information indicating the camera close call is associated with the mode switch comprises context information indicating the camera close call is associated with at least one of: a change between a standard dynamic range mode and a high dynamic range mode, a change between capturing still images and capturing video, or a change between a first camera sensor and a second camera sensor.

11. The computing device of claim 8, wherein the context information indicating the camera close call is associated with the close of the camera comprises context information indicating the camera close call is associated with at least one of: input on a close button of the computing device or input on a home button of the computing device.

12. The computing device of claim 7, wherein the one or more processors are further configured to cause the computing device to:

after setting the operation mode, deallocate resources for a camera sensor of the computing device.

13. A non-transitory computer readable medium storing instructions that, when executed by a computing device, cause the computing device to perform operations for power control, the operations comprising:

receiving, from an application running on the computing device, a camera close call, wherein the camera close call is an application programming interface (API) call to an API of a framework running on the computing device;

issuing a camera close event, based on the camera close call, to an interface between the framework and a camera driver, wherein the interface communicates with the camera driver configured to control a camera sensor of the computing device;

receiving, from the application, context information indicating whether the API camera close call is associated with a close of the camera or a mode switch of the camera;

issuing a callback to the application, based on the camera close call, to determine the context of the camera close call, wherein the callback is issued by the interface in response to the camera close event; and based on the context information, setting an operation mode of at least one of a processor or a bus.

* * * * *